UNITED STATES PATENT OFFICE 2,668,858

HYDRINDENEDIONE DERIVATIVES AND PROCESS FOR THEIR PREPARATION

Karl Miescher, Riehen, and Peter Wieland, Basel, Switzerland, assignors to Ciba Pharmaceutical Products, Inc., Summit, N. J.

No Drawing. Application May 14, 1951, Serial No. 226,276

Claims priority, application Switzerland May 17, 1950

4 Claims. (Cl. 260—586)

The present invention relates to condensation products of an aldehyde with two different ketones.

It is known that condensation products can be made for an aldehyde and two molecular proportions of one and the same ketone. If, on the other hand, it has been desired to react an aldehyde with two different ketones, the standard practice heretofore has been to react the aldehyde first with one of the ketones, and then to react the resulting condensation product with the second ketone. The reason for this relatively complicated method is ascribable to the expectation that the simultaneous bringing together of an aldehyde with two different ketones would not lead to the desired result.

A primary object of the present invention is the embodiment of a method wherein, contrary to the aforesaid standard procedure, an aldehyde is simultaneously condensed with two different ketones to produce the desired product. A further object of the invention is the production of new and useful hydrindenedione derivatives.

These objects are unexpectedly realized according to the present invention by reacting an aldehyde simultaneously with an open-chain keto compound and a methyl-cyclopentane-2,5-dione. The open-chain keto compound is preferably an aliphatic β-oxo-ketone, such as β-diketone, or β-keto-aldehyde, or a β-keto carboxylic acid or functional derivatives thereof, such as esters, amides or nitriles. The carbon atom connecting the two said groups must carry at least one hydrogen atom. It may, however, additionally carry a substituted or unsubstituted hydrocarbon radical, such as an alkyl group, for example a methyl, ethyl or propyl group. These ketones may also be further substituted. Illustrative of such keto compounds which may be employed according to the present invention are acetyl-acetone, acetoacetic acid, β-keto-adipic acid, β-keto-pimelic acid, and acetone-dicarboxylic acid.

The aforesaid keto compounds are, according to the present invention, reacted with an aldehyde primarily formaldehyde or with compounds which form such aldehydes, for example paraformaldehyde or methylene dihalides, such as methylene di-iodide.

According to the present invention, the keto compounds and methyl-cyclopentane-2,5-diones are used preferably in the form of their enolates or, in so far as they contain free carboxy groups, in the form of their salts. The condensation may be carried out in the presence of a condensing agent, particularly an alkaline condensing agent, such as a hydroxide or alcoholate of an alkali metal or alkaline earth metal, for example of sodium, potassium, lithium or calcium, or in the presence of a strong organic base such as a secondary cyclic amine or an organic quaternary ammonium hydroxide for example trimethyl-benzyl ammonium hydroxide. The reaction may be carried out in an anhydrous solvent, such as benzene, alcohol or ether, or in aqueous solution. The latter alternative is of special importance because in this way it becomes possible for the first time to carry out syntheses of this kind under approxmiately physiological conditions.

The condensation of the aldehydes with the keto compounds and methyl-cyclopentane-2,5-diones according to the present invention generally results in the formation of a cyclic α,β-unsaturated ketone, with liberation of two mols of water. In certain cases it is possible to isolate cyclic β-hydroxy-ketones. The latter can be dehydrated to the corresponding α,β-unsaturated ketones, for example by treatment with a dilute mineral acid or alkali. In those cases where the condensation according to the invention results in the formation of β-keto-carboxylic acids, these may be decarboxylated directly or subsequently. The following formulae illustrate the course of the reactions according to the invention:

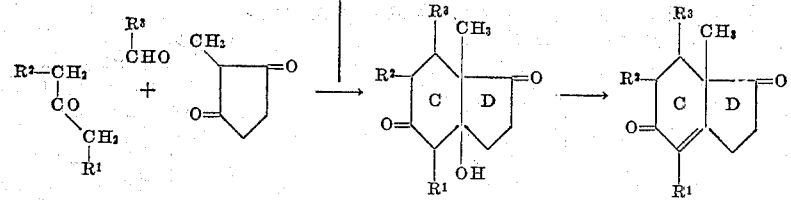

$R^1$, $R^2$ and $R^3$ stand for hydrogen or a substituted or unsubstituted hydrocarbon radical.

As is seen from the above formulae, the 3,6-diketo-9-methyl-hydrindenes represent rings C and D of the steroid skeleton. These new products are especially valuable in the synthesis of steroids.

The following examples illustrate the invention, the parts and percentages being by weight unless otherwise stated and the relationship of parts by weight to parts by volume being the same as that of the kilogram to the liter; the temperatures are indicated in degrees centigrade:

Example 1

30 parts by volume of 1-N caustic soda solution and 70 parts by volume of water are added to 1.68 parts of 1-methyl-cyclopentane-2,5-dione, 2.1 parts of acetone-dicarboxylic acid, 1.25 parts by volume of formaldehyde solution of 40 per cent. strength and 250 parts by volume of water in the course of 6½ hours while stirring. After 20 hours, the whole is mixed with 30 parts by volume of a 1-N solution of hydrochloric acid, and immersed for ¼ hour in a bath at 95°. The whole is then cooled and extracted with ether. After washing the ethereal solution with dilute caustic soda solution and water, and drying and evaporating it, the residue is distilled under a high vacuum. The resulting $\Delta^7$-3,6-diketo-9-methyl-hexahydroindene of the formula

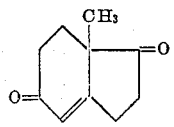

distils at a bath temperature of 90°, under a pressure of 0.05 mm. After recrystallization from isopropyl ether, it melts at 71–72°. The bis-dinitrophenylhydrazone melts at 264–265° with decomposition.

Example 2

To 5.1 parts of acetoacetic acid in 50 parts by volume of 1-N caustic soda solution, there is added a solution of 5.6 parts of 1-methyl-cyclopentane-2,5-dione in 50 parts by volume of 1-N caustic soda solution, 4 parts by volume of formaldehyde solution of 40 per cent. strength and 1 part by volume of piperidine. Then, at intervals of 24 hours, 5.1 parts of acetoacetic acid in 50 parts by volume of 1-N caustic soda solution and 4 parts by volume of formaldehyde solution of 40 per cent. strength are added, until three additions have been made. After the addition of 25 parts by volume of concentrated hydrochloric acid, the mixture is saturated with sodium chloride and is then extracted with ether. The ethereal solutions are dried and evaporated, and unreacted 1-methyl-cyclopentane-2,5-dione is separated by recrystallization of the residue from ether. The mother liquor is evaporated in vacuo, and the residue distilled at 0.01 mm. pressure. The distillate going over between 65 and 145° is subjected to chromatographic separation on aluminum oxide, and there is thus obtained 3,6-diketo-8-hydroxy-9-methyl-octahydroindene of the formula

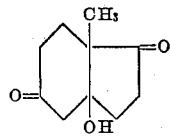

which, after recrystallization from chloroform-isopropyl ether, melts at 164°. The bis-dinitrophenylhydrazone melts at 262° (with decomposition).

0.2 part of the said hydroxy-diketone is mixed with 0.2 part of anhydrous oxalic acid and heated to 180°. The mixture is then heated within 2 minutes, to 190° and then quickly cooled. After the addition of an aqueous calcium chloride solution, the mixture is extracted with ether. The ethereal solution is dried and evaporated, and the resultant residue distilled under high vacuum. From the distillate, after recrystallization from isopropyl ether, there is obtained $\Delta^7$-3,6-diketo-9-methyl-hexahydroindene, melting at 71–72°.

Example 3

A solution of 5.6 parts of 1-methyl-cyclopentane-2,5-dione in 50 parts by volume of 1-N caustic soda solution, 4 parts by volume of a formaldehyde solution of 40 per cent. strength and 1 part by volume of piperidine are added to 5.8 parts of propionyl acetic acid in 50 parts by volume of 1-N caustic soda solution. There are then added three times, in intervals of 24 hours, 5.8 parts of propionyl acetic acid in 50 parts by volume of 1-N caustic soda solution and 4 parts by volume of a formaldehyde solution of 40 per cent. strength. The reaction solution is then mixed with 25 parts by volume of concentrated hydrochloric acid, saturated with sodium chloride, and extracted with ether. The ethereal solution is dried and evaporated and the residue recrystallized from ether to separate unreacted 1-methylcyclopentane-2,5-dione. The mother liquor is evaporated and chromatographed over aluminum oxide whereby the 3,6-diketo-8-hydroxy-7,9-dimethyl-octahydro-indene of the formula

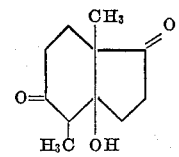

is obtained. When recrystallized from chloroform-isopropyl ether it melts at 146–147°. Dehydration is performed with oxalic acid in the manner described in Example 2 and leads to $\Delta^7$-3,6-diketo-7,9-dimethyl-hexahydro-indene of the formula

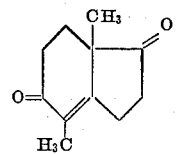

From 1-methyl-cyclopentane-2,5-dione, formaldehyde and β-keto-pimelic acid there is obtained in the same manner 3,6-diketo-7-(β-carboxy-ethyl)-8-hydroxy-9-methyl-octahydro-indene.

What is claimed is:

1. A process for the manufacture of a hydrindenedione derivative, which comprises reacting formaldehyde simultaneously with an open-chain keto compound having a carbonyl group in β-position and with methyl-cyclopentane-2,5-dione in the presence of a condensing agent.

2. A process for the manufacture of a hydrindenedione derivative, which comprises reacting formaldehyde simultaneously with an open-chain keto compound having a carbonyl group in β-position and with methyl-cyclopentane-2,5-dione in the presence of a condensing agent, and subjecting a resultant 3,6-diketo-8-hydroxy-9-methyl-hydrindene to the action of a dehydrating agent, whereby the corresponding $\Delta^7$-3,6-diketo-9-methyl-hydrindene is obtained.

3. A $\Delta^7$-3,6-diketo-9-methyl-hydrindene which is unsubstituted in the positions 1, 2 and 4.

4. $\Delta^7$-3,6-diketo-9-methyl-hexahydrindene.

KARL MIESCHER.
PETER WIELAND.

References Cited in the file of this patent

UNITED STATES PATENTS

| Number | Name | Date |
|---|---|---|
| 2,542,223 | Wendler et al. | Feb. 20, 1951 |

OTHER REFERENCES

Nazarov et al., "Izvest. Akad. Nauk S. S. S. R., Otdel Khim. Nauk," 1949 volume, pp. 439–442.

Abstracted in Chemical Abstracts, vol. 44, cols. 3458–3460, Apr. 1950.

Banerjee et al., J. Am. Chem. Soc., vol. 72, pp. 1931–1934, May 1950.